US009005021B2

(12) United States Patent
Massing et al.

(10) Patent No.: US 9,005,021 B2
(45) Date of Patent: Apr. 14, 2015

(54) SYSTEM AND METHOD FOR FLEXIBLE BANKING OF WAGERING GAME MACHINES

(71) Applicant: WMS Gaming Inc., Waukegan, IL (US)

(72) Inventors: Scott A. Massing, Lincolnwood, IL (US); Mark B. Gagner, West Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 108 days.

(21) Appl. No.: 13/772,497

(22) Filed: Feb. 21, 2013

(65) Prior Publication Data

US 2014/0057716 A1 Feb. 27, 2014

Related U.S. Application Data

(60) Provisional application No. 61/692,430, filed on Aug. 23, 2012.

(51) Int. Cl.
*A63F 9/24* (2006.01)
*A63F 13/00* (2014.01)
*G07F 17/32* (2006.01)

(52) U.S. Cl.
CPC ................ *A63F 13/00* (2013.01); *G07F 17/32* (2013.01); *G07F 17/3267* (2013.01)

(58) Field of Classification Search
USPC ................................................ 463/29, 31, 42
See application file for complete search history.

(56) References Cited

U.S. PATENT DOCUMENTS

| | | | |
|---|---|---|---|
| 4,738,451 | A | 4/1988 | Logg |
| 5,528,388 | A | 6/1996 | Tanaka |
| RE35,314 | E | 8/1996 | Logg |
| 5,741,181 | A | 4/1998 | Nakagawa et al. |
| 6,019,369 | A | 2/2000 | Nakagawa et al. |
| 6,077,162 | A | 6/2000 | Weiss |
| 6,126,547 | A | 10/2000 | Ishimoto |
| 6,146,269 | A | 11/2000 | Morihira |
| 6,162,120 | A | 12/2000 | Takahashi et al. |
| 6,439,995 | B1 | 8/2002 | Hughs-Baird et al. |
| 6,511,375 | B1 | 1/2003 | Kaminkow |
| 6,517,433 | B2 | 2/2003 | Loose et al. |
| 6,585,591 | B1 | 7/2003 | Baerlocher et al. |
| 6,585,600 | B1 | 7/2003 | Nakagawa et al. |
| 6,595,854 | B2 | 7/2003 | Hughs-Baird et al. |
| 6,648,753 | B1 | 11/2003 | Tracy et al. |
| 6,692,354 | B2 | 2/2004 | Tracy et al. |
| 6,800,026 | B2 | 10/2004 | Cannon |
| 6,802,775 | B2 | 10/2004 | Baerlocher et al. |
| 6,932,701 | B2 | 8/2005 | Glavich et al. |
| 6,986,710 | B2 | 1/2006 | Baerlocher et al. |
| 7,077,744 | B2 | 7/2006 | Cannon |
| 7,104,886 | B2 | 9/2006 | Baerlocher et al. |

(Continued)

*Primary Examiner* — Steve Rowland
(74) *Attorney, Agent, or Firm* — Nixon Peabody LLP

(57) ABSTRACT

A method of altering a wagering game theme for a flexible bank of wagering game machines, the flexible bank including a first sub-portion, a second sub-portion, and one or more display elements disposed between the first and second sub-portions, includes the acts of displaying graphical content relating to a first wagering game theme on the first and second sub-portions and on the one or more display elements and using a controller, responsive to a trigger, to switch the second sub-portion to display a second wagering game theme different than the first wagering game theme and to cause the one or more display elements to display a blank display or graphical content different than the first and second wagering game themes.

22 Claims, 5 Drawing Sheets

(56) References Cited

U.S. PATENT DOCUMENTS

| | | | |
|---|---|---|---|
| 7,182,689 | B2 | 2/2007 | Hughs-Baird et al. |
| 7,273,415 | B2 | 9/2007 | Cregan et al. |
| 7,303,469 | B2 | 12/2007 | Kaminkow |
| 7,314,408 | B2 | 1/2008 | Cannon |
| 7,544,129 | B2 | 6/2009 | Baerlocher |
| 7,566,271 | B2 | 7/2009 | Hostetler et al. |
| 7,585,218 | B2 | 9/2009 | Mead et al. |
| 7,662,040 | B2 | 2/2010 | Englman et al. |
| 7,713,124 | B2 | 5/2010 | Cuddy et al. |
| 7,758,423 | B2 | 7/2010 | Foster et al. |
| 7,780,531 | B2 | 8/2010 | Englman et al. |
| 7,824,260 | B2 | 11/2010 | Aida |
| 7,828,649 | B2 | 11/2010 | Cuddy et al. |
| 7,833,094 | B2 | 11/2010 | Englman et al. |
| 7,874,912 | B2 | 1/2011 | Cregan et al. |
| 7,874,920 | B2 | 1/2011 | Hornik et al. |
| 7,901,282 | B2 | 3/2011 | Cannon |
| 7,985,128 | B2 | 7/2011 | Fong |
| 8,033,912 | B2 | 10/2011 | Cannon |
| 8,057,294 | B2 | 11/2011 | Pacey et al. |
| 8,057,295 | B2 | 11/2011 | Vann et al. |
| 8,070,593 | B2 | 12/2011 | DeWaal et al. |
| 8,100,760 | B2 | 1/2012 | Cannon |
| 8,109,821 | B2 | 2/2012 | Kovacs et al. |
| 8,123,610 | B2 | 2/2012 | Hornik |
| 8,147,336 | B2 | 4/2012 | Hirota |
| 8,172,687 | B2 | 5/2012 | Gagner et al. |
| 8,197,331 | B2 | 6/2012 | Pacey et al. |
| 8,202,151 | B2 | 6/2012 | Fong |
| 8,202,156 | B2 | 6/2012 | Bartholomew |
| 8,235,784 | B2 | 8/2012 | Christensen |
| 8,235,785 | B2 | 8/2012 | Thomas |
| 8,235,791 | B2 | 8/2012 | Kelly |
| 8,235,792 | B2 | 8/2012 | Kelly |
| 8,241,106 | B2 | 8/2012 | Kelly |
| 8,262,456 | B2 | 9/2012 | Englman et al. |
| 8,292,720 | B2 | 10/2012 | Davis et al. |
| 8,292,731 | B2 | 10/2012 | Collette et al. |
| 8,298,066 | B2 | 10/2012 | Kelly et al. |
| 8,298,067 | B2 | 10/2012 | Kelly et al. |
| 8,303,394 | B2 | 11/2012 | Englman et al. |
| 8,313,368 | B2 | 11/2012 | Filipour et al. |
| 8,317,603 | B2 | 11/2012 | Anderson |
| 8,342,927 | B2 | 1/2013 | Englman et al. |
| 8,371,919 | B2 | 2/2013 | Hornik et al. |
| 8,382,572 | B2 | 2/2013 | Hoffman et al. |
| 8,393,948 | B2 | 3/2013 | Allen et al. |
| 8,403,740 | B2 | 3/2013 | Kovacs et al. |
| 8,403,758 | B2 | 3/2013 | Hornik et al. |
| 8,435,120 | B2 | 5/2013 | Hornik et al. |
| 8,469,797 | B2 | 6/2013 | Collette et al. |
| 2002/0020966 | A1 | 2/2002 | Tanaka |
| 2004/0204226 | A1 | 10/2004 | Foster et al. |
| 2006/0009283 | A1 | 1/2006 | Englman et al. |
| 2006/0073880 | A1 | 4/2006 | Thomas |
| 2006/0073897 | A1 | 4/2006 | Englman et al. |
| 2006/0135243 | A1 | 6/2006 | Englman et al. |
| 2006/0189378 | A1 | 8/2006 | Aoki |
| 2006/0199644 | A1 | 9/2006 | Hirota |
| 2006/0205492 | A1 * | 9/2006 | Linard et al. .................... 463/29 |
| 2006/0217202 | A1 * | 9/2006 | Burke et al. .................... 463/42 |
| 2006/0287043 | A1 | 12/2006 | Englman |
| 2007/0077990 | A1 | 4/2007 | Cuddy et al. |
| 2007/0117616 | A1 | 5/2007 | Bartholomew |
| 2008/0004105 | A1 | 1/2008 | Cregan et al. |
| 2008/0020823 | A1 | 1/2008 | Cuddy et al. |
| 2008/0020827 | A1 * | 1/2008 | Underdahl et al. ............ 463/25 |
| 2008/0026813 | A1 | 1/2008 | Cannon |
| 2008/0032764 | A1 | 2/2008 | Cannon |
| 2008/0045341 | A1 | 2/2008 | Englman |
| 2008/0102916 | A1 | 5/2008 | Kovacs et al. |
| 2008/0113768 | A1 | 5/2008 | Baerlocher |
| 2008/0139305 | A1 | 6/2008 | Vallejo et al. |
| 2008/0200259 | A1 | 8/2008 | Deng |
| 2008/0200260 | A1 | 8/2008 | Deng |
| 2008/0268959 | A1 | 10/2008 | Bryson et al. |
| 2008/0311980 | A1 | 12/2008 | Cannon |
| 2009/0011824 | A1 * | 1/2009 | Englman et al. ................ 463/25 |
| 2009/0042644 | A1 | 2/2009 | Zielinski |
| 2009/0048012 | A1 | 2/2009 | Patel et al. |
| 2009/0093298 | A1 | 4/2009 | Michel |
| 2009/0191942 | A1 | 7/2009 | Bennett |
| 2009/0270156 | A1 | 10/2009 | Christensen |
| 2009/0270157 | A1 | 10/2009 | Christensen |
| 2009/0275410 | A1 | 11/2009 | Kisenwether et al. |
| 2009/0275411 | A1 | 11/2009 | Kisenwether et al. |
| 2010/0029363 | A1 | 2/2010 | Hoffman et al. |
| 2010/0041464 | A1 | 2/2010 | Arezina et al. |
| 2010/0069149 | A1 | 3/2010 | Kisenwether et al. |
| 2010/0069160 | A1 | 3/2010 | Barrett et al. |
| 2010/0120484 | A1 | 5/2010 | Caputo et al. |
| 2010/0120494 | A1 | 5/2010 | DeWaal et al. |
| 2010/0120503 | A1 | 5/2010 | Hoffman et al. |
| 2010/0137056 | A1 | 6/2010 | Hoffman et al. |
| 2010/0222123 | A1 | 9/2010 | Hornik |
| 2010/0234090 | A1 | 9/2010 | Thomas |
| 2010/0234099 | A1 | 9/2010 | Rasmussen et al. |
| 2010/0267439 | A1 | 10/2010 | Englman et al. |
| 2010/0267442 | A1 | 10/2010 | Englman et al. |
| 2010/0279764 | A1 | 11/2010 | Allen et al. |
| 2010/0304825 | A1 | 12/2010 | Davis et al. |
| 2010/0304830 | A1 | 12/2010 | Englman et al. |
| 2010/0317424 | A1 | 12/2010 | Hornik et al. |
| 2010/0317442 | A1 | 12/2010 | Thomas et al. |
| 2011/0034239 | A1 | 2/2011 | Collette et al. |
| 2011/0045898 | A1 | 2/2011 | Anderson |
| 2011/0065495 | A1 | 3/2011 | Hornik et al. |
| 2011/0070940 | A1 | 3/2011 | Jaffe et al. |
| 2011/0070941 | A1 | 3/2011 | Aida |
| 2011/0105233 | A1 | 5/2011 | Aoki |
| 2011/0111843 | A1 | 5/2011 | Nicely et al. |
| 2011/0124393 | A1 | 5/2011 | Hornik et al. |
| 2011/0130192 | A1 | 6/2011 | Englman et al. |
| 2011/0201410 | A1 | 8/2011 | Englman et al. |
| 2011/0207523 | A1 | 8/2011 | Filipour et al. |
| 2011/0212767 | A1 | 9/2011 | Barclay et al. |
| 2011/0300926 | A1 | 12/2011 | Englman et al. |
| 2012/0009992 | A1 | 1/2012 | Cannon |
| 2012/0015713 | A1 | 1/2012 | Cannon |
| 2012/0028703 | A1 | 2/2012 | Anderson et al. |
| 2012/0046088 | A1 | 2/2012 | DeWaal et al. |
| 2012/0046112 | A1 | 2/2012 | DeWaal et al. |
| 2012/0071226 | A1 | 3/2012 | Pacey et al. |
| 2012/0094752 | A1 | 4/2012 | Cannon |
| 2012/0108319 | A1 | 5/2012 | Caputo et al. |
| 2012/0122564 | A1 | 5/2012 | Kovacs et al. |
| 2012/0142432 | A1 | 6/2012 | Bartholomew |
| 2012/0184351 | A1 | 7/2012 | Hornik et al. |
| 2012/0202588 | A1 | 8/2012 | Gagner et al. |
| 2012/0202601 | A1 | 8/2012 | Gagner et al. |
| 2012/0231868 | A1 | 9/2012 | Guinn |
| 2013/0017885 | A1 | 1/2013 | Englman et al. |
| 2013/0029752 | A1 | 1/2013 | Davis et al. |
| 2013/0040730 | A1 | 2/2013 | Barclay et al. |
| 2013/0079072 | A1 | 3/2013 | Filipour et al. |
| 2013/0079076 | A1 | 3/2013 | Filipour et al. |
| 2013/0084941 | A1 | 4/2013 | Caputo et al. |
| 2013/0084965 | A1 | 4/2013 | Gura et al. |
| 2013/0090156 | A1 | 4/2013 | Oh et al. |
| 2013/0122995 | A1 | 5/2013 | Detlefsen et al. |

* cited by examiner

SYSTEM AND METHOD FOR FLEXIBLE BANKING OF WAGERING GAME MACHINES

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to wagering games, and methods for playing wagering games, and more particularly, to wagering games that are banked together.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

In multi-player wagering games, would-be players need to be encouraged and incentivized to participate in community games. Onlookers of a community game in progress need to feel that their participation will enhance their chances of winning an award, more so than if they were to play a wagering game individually. These and other unfulfilled needs are addressed by the present disclosure.

SUMMARY OF THE INVENTION

In one aspect of the present concepts, a flexible bank includes a first sub-portion comprising one or more first wagering game machines, a second sub-portion comprising one or more second wagering game machines and one or more display elements, disposed between the first and second sub-portions. The flexible bank also includes one or more processors and one or more memory devices storing instructions that, when executed by the one or more processors, cause the flexible bank to display a first game theme on the first sub-portion, display a second game theme on the second sub-portion, responsive to a first triggering event, switch the second theme presented on the second sub-portion to the first theme of the first sub-portion and responsive to the first triggering event, change a state of the one or more display elements from a first state, displaying a blank display or displaying graphical content different than the first theme or the second theme, to a second state, displaying graphics relating to the first theme to thereby unify a thematic presentation between the first and second sub-portions.

In another aspect of the present concepts, a flexible bank system includes a flexible bank including first sub-portion comprising one or more first wagering game machines, a second sub-portion comprising one or more second wagering game machines and one or more display elements, disposed between the first and second sub-portions. The flexible bank system includes one or more processors and one or more memory devices storing instructions that, when executed by the one or more processors, cause the flexible bank to display a first game theme on the first sub-portion, display a second game theme on the second sub-portion, responsive to a first triggering event, switch the second theme presented on the second sub-portion to the first theme of the first sub-portion and responsive to the first triggering event, change a state of the one or more display elements from a first state, displaying a blank display or displaying graphical content different than the first theme or the second theme, to a second state, displaying graphics relating to the first theme to thereby unify a thematic presentation between the first and second sub-portions.

In another aspect of the present concepts, a method of altering a wagering game theme for a flexible bank of wagering game machines, the flexible bank including a first sub-portion, a second sub-portion, and one or more display elements disposed between the first and second sub-portions, comprising the acts of configuring the flexible bank to display a first wagering game theme on the first and second sub-portions and on the one or more display elements disposed between the first and second sub-portions, and using the one or more processors, monitoring an occupancy condition. The method further includes using the one or more processors to determine if the occupancy condition falls below a predetermined threshold and, if the occupancy condition falls below the predetermined threshold, reconfigure the flexible bank to display a second wagering game theme on the second sub-portion. The method further includes using the one or more processors to display graphical content on the one or more display elements that is different from the first wagering game theme and the second wagering game theme.

In still another aspect of the present concepts, a method of altering a wagering game theme for a flexible bank of wagering game machines, the flexible bank including a first sub-portion, a second sub-portion, and one or more display elements disposed between the first and second sub-portions, includes the acts of displaying graphical content relating to a first wagering game theme on the first and second sub-portions and on the one or more display elements and using a controller, responsive to a trigger, to switch the second sub-portion to display a second wagering game theme different than the first wagering game theme and to cause the one or more display elements to display a blank display or graphical content different than the first and second wagering game themes.

Additional aspects of the invention will be apparent to those of ordinary skill in the art in view of the detailed description of various embodiments, which is made with reference to the drawings, a brief description of which is provided below.

Figure 1:
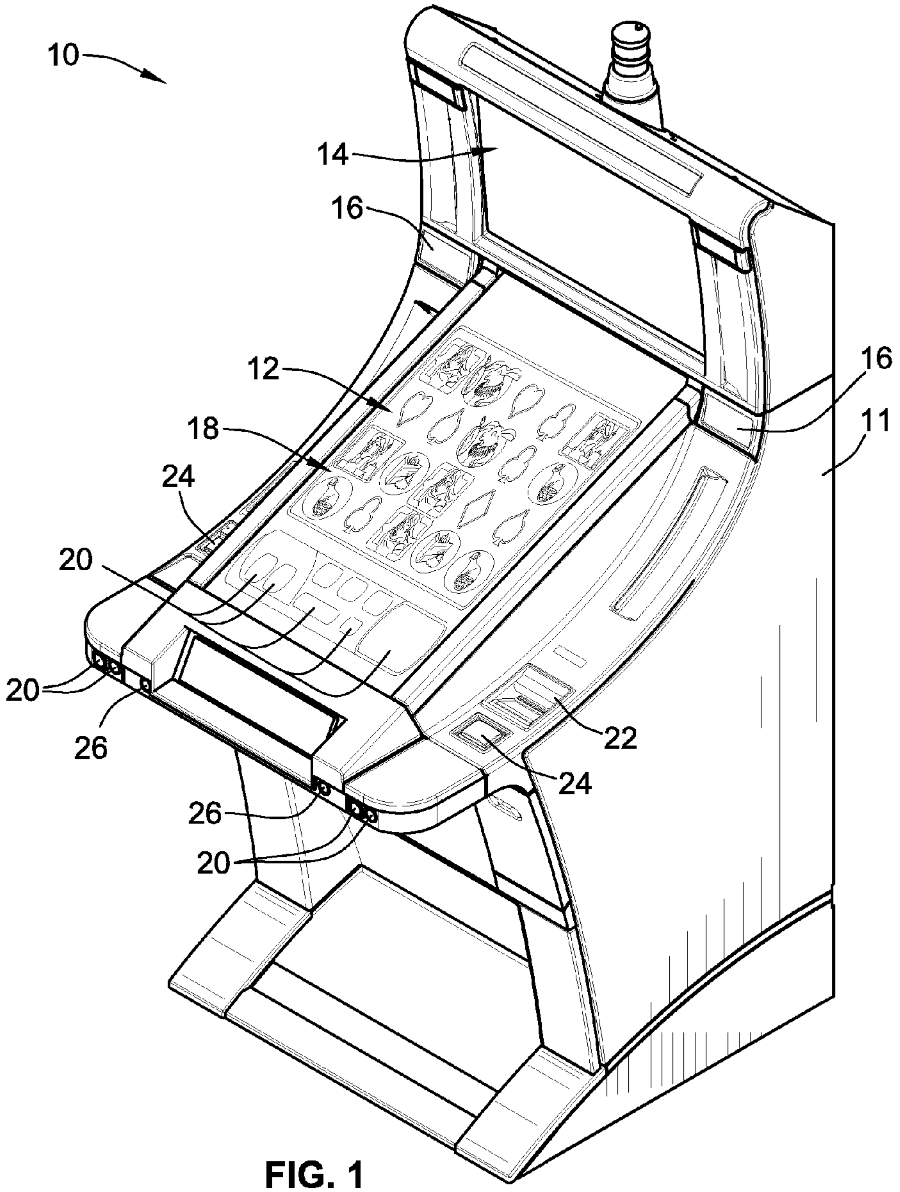
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bar-top models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, titled "Reel Spinning Slot Machine with Superimposed Video Image," U.S. Patent Application Publication Nos. US2010/0069160, titled "Handheld Wagering Game Machine and Docking Unit," and US2010/0234099, titled "Wagering Game System With Docking Stations," and U.S. patent application Ser. No. 13/245,135, filed on Sep. 26, 2011, and titled "Wagering Game With Multiple Overlying Reel Strips For Triggering Events Or Outcomes," which are each incorporated herein by reference in their entirety.

The gaming terminal 10 illustrated in FIG. 1 comprises a cabinet 11 that may house various input devices, output devices, and input/output devices. By way of example, the gaming terminal 10 or wagering game machine includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
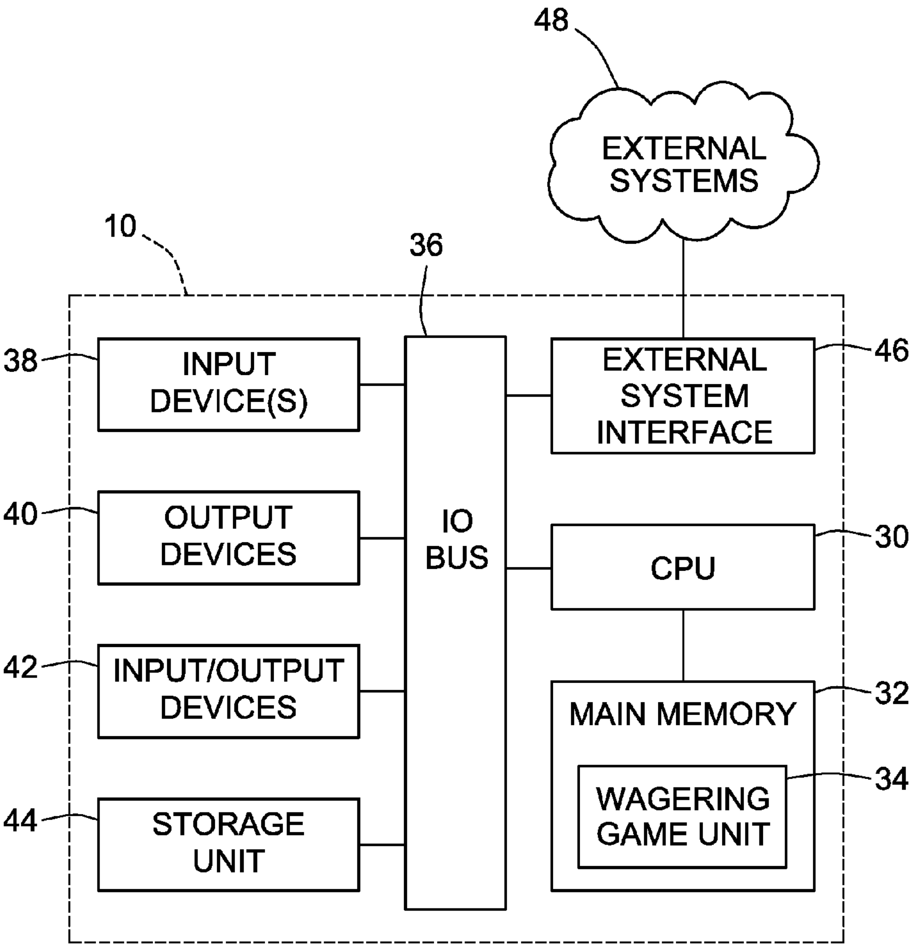
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
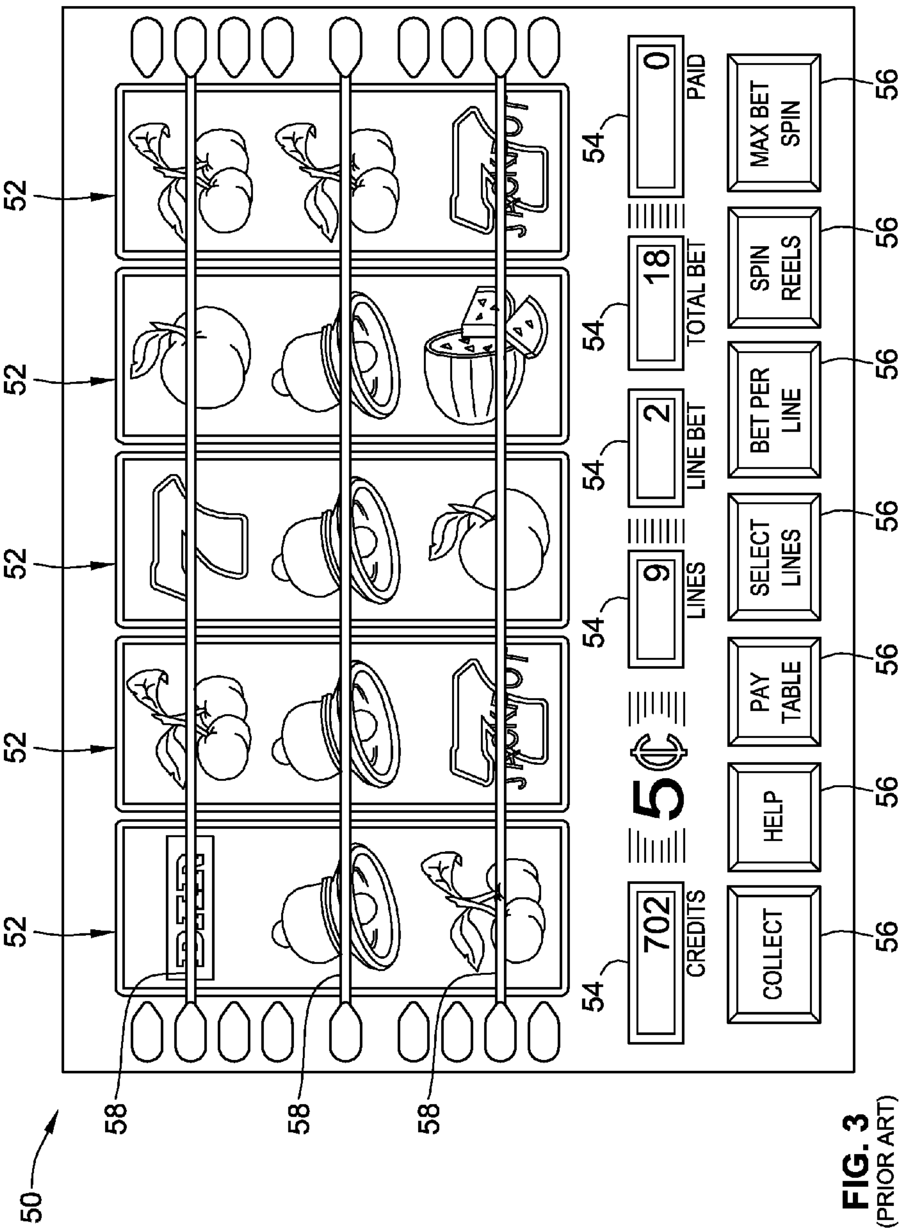
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
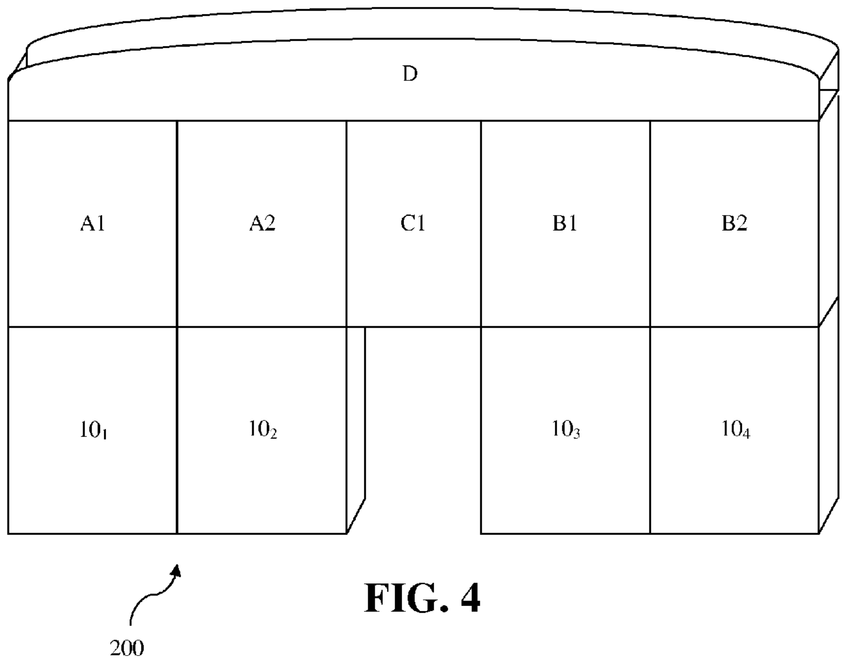
FIG. 4 is a representation of a flexible wagering game machine bank in accord with at least some aspects of the present concepts.

Turning now to FIG. 4, an example of a flexible wagering game machine bank 200 in accord with at least some aspects of the present concepts is disclosed comprising four wagering game machines $\mathbf{10}_1$-$\mathbf{10}_4$. A flexible wagering game machine bank 200, in accord with the present concepts, comprises a plurality of wagering game machines (e.g., two or more) arranged side-by-side, back to back, in an arc or a circle, or in any other physical arrangement that permits presentation of a unified theme.

Figure 5:
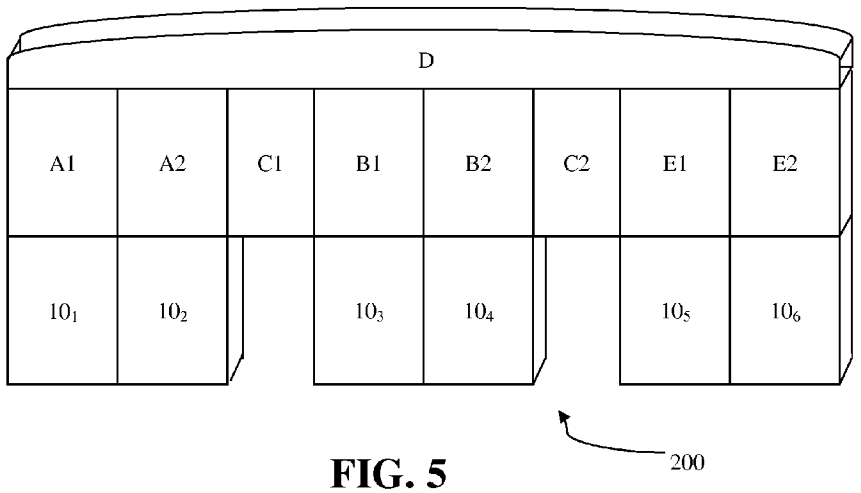
FIG. 5 is a representation of a flexible wagering game machine bank in accord with at least some aspects of the present concepts.

Above each of the wagering game machines $\mathbf{10}_1$-$\mathbf{10}_4$ is disposed a respective display segment (i.e., A1-A2, B1-B2, as shown in FIG. 4), which may a secondary display 14 or another display separate from any secondary display 14. As depicted in FIG. 4, the display segments A1-A2, C, B1-B2, are separate from any secondary display 14 that might optionally be provided with the wagering game machines $\mathbf{10}_1$-$\mathbf{10}_4$. Display element A1 is disposed above wagering game machine $\mathbf{10}_1$, display element A2 is disposed above wagering game machine $\mathbf{10}_2$, display element B1 is disposed above wagering game machine $\mathbf{10}_3$, and display element B2 is disposed above wagering game machine $\mathbf{10}_4$. Another display element C1 is disposed between wagering game machine $\mathbf{10}_2$ and wagering game machine $\mathbf{10}_3$. An optional display element D is disposed above a plurality of the wagering game machines, such as wagering game machines $\mathbf{10}_1$-$\mathbf{10}_4$ as shown in FIG. 4. Although the example of a flexible wagering game machine bank system shown in FIG. 4 depicts a flexible bank 200 of four wagering game machines, the concepts of the flexible wagering game machine banking system disclosed herein apply equally to a bank of wagering game machines of any size $\mathbf{10}_1$-$\mathbf{10}_x$, where x represents any integer (e.g., 3, 4, 5, 6, 7, 8, etc. wagering game machines). FIG. 5 shows a representation of a flexible bank 200 of six wagering game machines.

In addition to the depicted display elements A1-A2, B1-B2, C1 and D, additional display elements can optionally be provided on other portions of the wagering game machine $\mathbf{10}_1$-$\mathbf{10}_4$ cabinets, such as the belly glass, feature glass or top box glass, insert glass, side glass at lateral sides of a cabinet, rear or side surfaces of a wagering game machine player seat, or any surface of the wagering game machine(s) and/or bank 200 and/or area display(s) that are able to be utilized for a display purpose for the bank.

Figure 6:
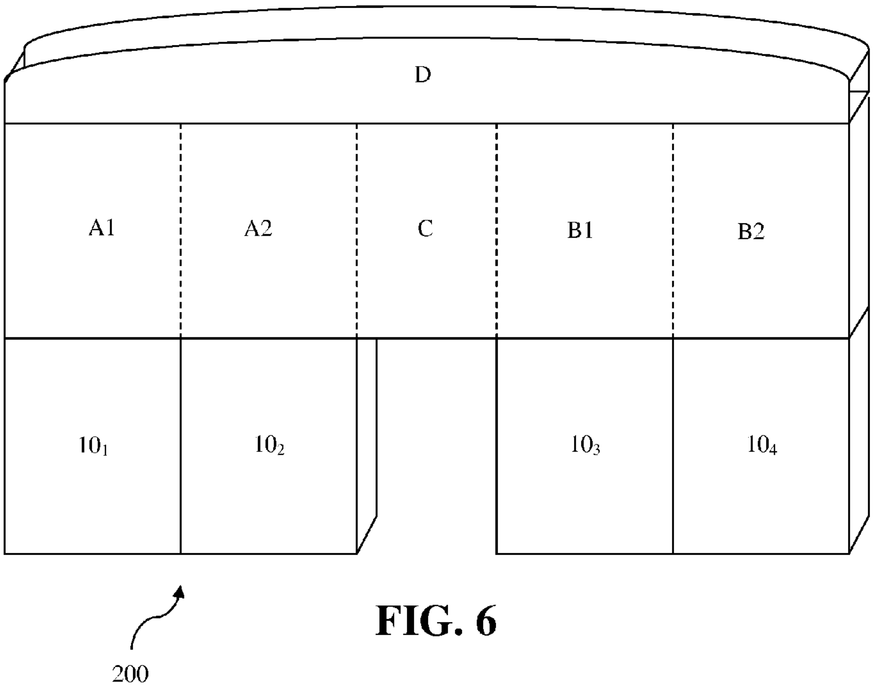
FIG. 6 is a representation of a flexible wagering game machine bank in accord with at least some aspects of the present concepts.

The display elements (e.g., A1, A2, B1, B2, C1, D) may be physically distinct display devices, as represented in FIGS. 4-5, or may be virtual sub-portions of one or more larger displays, as represented in FIG. 6, wherein the dashed lines are used to indicate the boundaries of the virtual displays during at least one mode of operation. For example, display elements A1, A2, B1, B2, C1, and D may be separate partitioned sections of a single large display device. In one aspect, each of the display elements (e.g., A1, A2, B1, B2, C1, D, etc.) comprises a high-resolution (e.g., HD, FHD, WQHD, QFHD, WQHD, QXGA, WQXGA, QSXGA, WQSXGA, HXGA, etc.) LCD flat panel display or OLED display, preferably with minimized or ultra-narrow bezels to thereby provide a correspondingly narrow image-to-image gap (e.g., less than 5 mm, 5-10 mm, etc.) to enhance a seamlessness of a display when multiple display elements are unified to function as a single display. In another aspect, one or more of the display elements may differ from one another. For example, display elements A1-A2 and B1-B2 are configured as a first display type, display element C1 is configured as a second display type, display element D is configured as a third display type, display elements (not shown) on chair backs of the wagering game machines $\mathbf{10}_1$-$\mathbf{10}_4$ are configured as a fourth display type, and display elements (not shown) on the bellies of the wagering game machines $\mathbf{10}_1$-$\mathbf{10}_4$ are configured as a fifth display type.

As one option, the display elements (not shown) on the chair backs of the wagering game machines $\mathbf{10}_1$-$\mathbf{10}_4$ and/or on the bellies of the wagering game machines $\mathbf{10}_1$-$\mathbf{10}_4$ may comprise an ultraviolet (UV) type display such as, but not limited to, a Transitions Effect™ display system manufactured by Transitions Digital Graphics of Santa Barbara, Calif. The UV type display enables displays to be printed using a variety of different UV sensitive inks to remain mostly invisible under normal light and, when subjected to various components of UV light, these inks selectively become visible. A variety of different inks (e.g., responsive to different wavelengths of UV light) can be used to permit stacking of multiple images, allowing selective activation and deactivation of specific images. Thus, a UV type display could have graphics for two, three or more different wagering games and the graphics for a selected game activated on the chair back and/or belly glass of the wagering game machine by changes to the edge lighting of the display.

Further, each of the aforementioned display elements may comprise a plurality of constituent display sub-elements. For example, display element A1 could comprise display sub-elements $A1_1$, $A1_2$, $A1_3$, $A1_4$, . . . $A1_X$, where x represents any integer, and so on with one or more of the other display elements. The sub-elements (e.g., $A1_1$, $A1_2$, $A1_3$, $A1_4$, . . . $A1_X$) may be physical sub-elements (i.e., physically distinct displays) or may be virtual sub-elements (e.g., partitioning of a single display, such as is represented in FIG. 6).

In operation, the bank display elements A1-A2, B1-B2, C1, D, and/or any additional display elements other than the primary wagering game display, can be selectively controlled to display the same wagering game theme or one or more different wagering game themes. In this manner, a single bank 200 comprising wagering game machines $\mathbf{10}_1$-$\mathbf{10}_4$ and corresponding display elements A1-A2 and B1-B2 can be optionally represented by two different themes, in a first configuration, where display elements A1-A2 (and optionally additional display elements such as, but not limited to, chair back display elements) are used to display a first theme (e.g., Star Trek™ Battlestations) and where display elements B1-B2 (and optionally additional display elements such as, but not limited to, chair back display elements) are used to display a second theme (e.g., WMS Gaming's Pirate Battle®). In this first illustrative configuration, the center display element C1 is advantageously rendered to provide no visual output (i.e., a dark state).

Thus, in accord with the present concepts, a single bank 200 of four wagering game machines $\mathbf{10}_1$-$\mathbf{10}_4$ can be dynamically configured, in combination with one or more corresponding display elements (e.g., A1-A2, B1-B2, C1 and D as shown in FIG. 4), to represent one, two, three, or four different themes. In accord with the present concepts, a single bank of five or six wagering game machines can be dynamically represented by a correspondingly higher upper number of different themes (i.e., five and six, respectively). By way of example, a flexible bank 200 of wagering game machines $\mathbf{10}_1$-$\mathbf{10}_X$ can dynamically switch between a single bank layout (e.g., a community event game such as a full WMS Gaming Big Event layout) to two, dual-bank layouts having different themes.

The dynamic switching of a bank from one state (e.g., a single theme) to another state (e.g., multiple themes) may be accomplished in a variety of ways in accord with the present concepts, which are set forth in further detail herein. In a first embodiment, the flexible bank 200, or a portion thereof (e.g., an individual wagering game machine, a sub-portion of the bank comprising a plurality of wagering game machines, etc.) is switchable manually from one state to another by player input(s) via a player input device such as, but not limited to, touch screen 18 or buttons 20. In a second embodiment, the flexible bank 200 is switchable by the CPU 30 based on an occupancy factor. The occupancy factor, in various aspects, relates to occupancy of the flexible bank 200 (i.e., a number of players at the flexible bank), occupancy of an area around the flexible bank 200 (e.g., floor traffic in the area of the flexible bank), a general occupancy level in the casino at a given time. In a third embodiment, the flexible bank 200 is switchable by the CPU 30 based on one or more factors other than occupancy such as, but not limited to, a pre-scheduled day or time, a level of coin-in, a predetermined sequence (e.g., a cyclic attract sequence), or randomly. In a fourth embodiment, the flexible bank 200 is switchable by the CPU 30 based on a game-related event such as, but not limited to, a progressive event or a community bonus event. In a fourth embodiment, a sub-portion of the bank comprising at least one wagering game machine is automatically switched from one state to another by player input of information identifying the player to the wagering game system (e.g., biometric input, player card insertion, player fob device, entry of player information into touch screen 18 login, etc.) to recall and automatically implement a player preference stored in their login profile. In this fourth embodiment, for example, a player sitting at an empty bank could, via preset player preferences, have the entire bank automatically switch to their desired game theme, or alternatively, to implement a dissimilar theme on their wagering game machine (e.g., $\mathbf{10}_1$) than the remainder of the bank (e.g., to provide the player with a greater likelihood of solitude) or to a two wagering game machine set (e.g., $\mathbf{10}_1$-$\mathbf{10}_2$).

An occupancy condition for the flexible bank may comprise any level of occupancy of the entire flexible bank or of separately defined sub-portions thereof. For example, a change of the flexible bank 200 from a first state (e.g., a single wagering game theme across the entire flexible bank) to a second state (e.g., multiple wagering game themes presented on the flexible bank), or vice versa, may be preconditioned on a predetermined number of players at the flexible bank, such as but not limited to, the absence of any players at the flexible bank (i.e., a null set of players). As another example, a change of the flexible bank 200 from a first state (e.g., a single wagering game theme across the entire flexible bank) to a second state (e.g., multiple wagering game themes across the entire flexible bank), or vice versa, may be permitted if there is only one player at the flexible bank and only if the state to which the flexible bank is changed is the same theme as that played by such player. In another example, a change of the flexible bank 200, or a sub-portion thereof, from the second state (e.g., multiple wagering game themes) to a first state (e.g., a single wagering game theme) may be preconditioned on an occupancy condition comprising an absence of an active dissimilar intervening wagering game theme (i.e., a player playing a wagering game of a second wagering game theme between two players playing wagering games of a first wagering game theme). Such occupancy condition may optionally be time limited. For example, if a flexible bank is unoccupied by any players for a predetermined period of time (e.g., 1 minute, 3 minutes, 5 minutes, 10 minutes), the flexible bank can be dynamically adjusted to from a single theme to a dual theme (or vice versa).

An occupancy condition for an area of the flexible bank could comprise an absolute number of people (e.g., 10, 20, 30, etc.) within a predetermined distance from the flexible bank 200 (e.g., 10 feet, 15 feet, etc.) or a predetermined rate of traffic (e.g., 5 people per minute, etc.) within a predetermined distance from the flexible bank 200. Further, an occupancy condition for a casino that could prompt reconfiguration of the flexible bank from a first state to a second state, or vice versa, may comprise a level of floor traffic that is greater than (or less than) an average floor traffic for a like day, time and/or date. Thus, if average floor traffic in the casino is higher than usual, a dual theme flexible bank can be dynamically adjusted to present a single theme or, conversely, if average floor traffic in the casino is lower than usual, a single theme flexible bank can be dynamically adjusted to present a dual theme.

Turning to the first embodiment noted above, and with reference to FIG. 4, a first player finds the unattended flexible bank 200 and sits at wagering game machine $\mathbf{10}_1$. The player inputs funds from which to wager and is presented with a touch screen selection of available wagering game themes or a corresponding specialized game selection buttons, or the like to select a theme that the player wishes to play on wagering game machine $\mathbf{10}_1$.

In at least one aspect of the present concepts, a first player to occupy the flexible bank 200 is optionally provided with one or more incentives for being the first player at the flexible bank. Incentive(s), beyond the ability to potentially have dibs on setting the theme for the flexible bank 200, could include non-game incentives, such as personalization of an appearance of the flexible bank, or sub-portion thereof (e.g., specially selected skins or displays on seat back display, section of color schemes, etc.). The optional incentive(s) could also or alternatively include game-related incentives such as, but not limited to, a multiplier bonus for one or more plays of a bonus game feature or bonus community game feature on the flexible bank 200. In some aspects, different incentives could be provided to different participants at the flexible bank based on their priority at the bank from a time at which the flexible bank was not occupied. For example, a first player receives a first incentive, a second player receives a second incentive that is less than that of the first incentive (e.g., a lesser multiplier bonus that that of the first incentive for one or more plays of a bonus game feature or bonus community game feature on the flexible bank 200, or a same multiplier as the first incentive, but application of that multiplier over a lesser number of plays of the bonus game feature or bonus community game feature).

Optionally, the first player at the bank 200 may be enabled to select the theme for one or more of the other wagering game machines $\mathbf{10}_2$-$\mathbf{10}_4$. For example, a first player at the flexible bank 200 sitting at wagering game machine $\mathbf{10}_1$ may select the theme not only for his or her wagering game machine $\mathbf{10}_1$, but also the wagering game theme displayed at adjacent wagering game machine $\mathbf{10}_2$. In this context, early players at the flexible bank 200 have a greater degree of control over the theme of the bank and, wherein a first player has an open choice and subsequent players may be able to select the same theme, but may be limited in selecting a differing theme based on the population of the flexible bank and thematic selections of the other players.

In the above-noted second embodiment, the flexible bank 200 is switchable by the CPU 30 based on an occupancy factor such as, but not limited to an occupancy of the flexible bank 200 (i.e., a number of players at the flexible bank and/or an arrangement of players at the flexible bank), occupancy of an area around the flexible bank 200 (e.g., traffic in the area of the flexible bank), and/or a general occupancy level in the casino at a given time.

As one example, once players occupying half of the wagering game machines at a given flexible bank 200 have selected a common theme, the CPU 30 automatically switches the remainder of the wagering game machines at the flexible bank 200, and all of their respective displays, display elements and signage, to reflect that common theme. Thus, a plurality of players at the flexible bank 200 may select the theme for the entire flexible bank. For example, a player at wagering game machine $\mathbf{10}_1$ selecting a first theme and a player at wagering game machine $\mathbf{10}_3$ also selecting a first theme may force the entire flexible bank 200 into the first theme so that any new players (e.g., at wagering game machine $\mathbf{10}_2$) would be constrained to play the first theme. Likewise, were the player at wagering game machine $\mathbf{10}_1$ to leave, the player at wagering game machine $10_2$ would no longer be constrained to play the first theme and the player would then be provided by the CPU 30 the option of selecting another theme for the sub-portion of the bank represented by wagering game machines $10_1$-$10_2$.

In accord with the second embodiment, the CPU 30 is configured to automatically adjust the theme(s) displayed on the wagering game machines of the flexible bank based on occupancy of an area around the flexible bank 200.

By way of example, if there is very little floor traffic (e.g., determined by utilization of other wagering game machines in the area of the flexible bank 200, sensors, cameras coupled with video analytics, background noise levels, employee inputs, etc.), the CPU 30 may be configured to switch the flexible bank 200 from a first configuration in which only a first theme is displayed across the flexible bank, inclusive of the wagering game machine displays and display elements A1-A2, C, and B1-B2, to a second configuration which displays a first theme on a first portion of the flexible bank 200 (e.g., wagering game machines $10_1$-$10_2$, together with display elements A1-A2 and any additional display elements associated wagering game machines $10_1$-$10_2$ of FIG. 4) and displays a second theme on a second portion of the flexible bank 200 (e.g., wagering game machines $10_3$-$10_4$, together with display elements B1-B2 and any additional display elements associated wagering game machines $10_1$-$10_2$ of FIG. 4). It is believed that, by providing multiple options and smaller flexible bank sections, the flexible bank 200 as a whole will be perceived to be more approachable and provide a higher likelihood of enticing a first player to sit at a wagering game machine on the bank. Optionally, the adjacent wagering game machine $10_2$ could then continue to display the same first theme, or could alternatively cycle between the first theme and the second theme in an attract sequence. At the same time, the remainder of the wagering game machines (e.g., wagering game machines $10_3$-$10_4$ of FIG. 4) could either continue to represent the second theme or alternatively cycle between the first theme and the second theme in an attract sequence.

In one example in at least some aspects of the present concepts, a high level of floor traffic local to the flexible bank 200 causes the CPU 30 to optionally display a unified theme across the flexible bank 200. For example, a high level of casino floor traffic could cause a CPU 30 controlling a six wagering game machine flexible bank 200 (e.g., wagering game machines $10_1$-$10_6$) to portray a WMS Gaming Big Event themed game on all of the wagering game machines, whereas a medium to low level of casino floor traffic could cause the CPU controlling the six wagering game machine flexible bank 200 to portray the WMS Gaming Big Event themed game on a sub-portion of the flexible bank and to portray one or more other game themes on the remainder of the wagering game machines (e.g., a first theme on wagering game machines $10_1$-$10_2$, a second theme on wagering game machines $10_3$-$10_4$, and a third theme on wagering game machines $10_5$-$10_6$). Accordingly, in at least some aspects of the present concepts, thematic manipulations by the CPU 30 of the non-occupied wagering game machines on the flexible bank 200 are premised at least in part upon an occupancy of the bank or other local measures of occupancy or traffic.

In one aspect of the noted third embodiment, the CPU 30 splits the bank into a plurality of different themes on a predetermined schedule, such as wagering game machines $10_1$-$10_2$ being represented by a first theme via display elements A1-A2 (and any additional display elements associated wagering game machines $10_1$-$10_2$) and wagering game machines $10_3$-$10_4$ being represented by a second theme via display elements B1-B2 (and any additional display elements associated wagering game machines $10_3$-$10_4$). Divided in this way, new players would be provided a selection of the themes based at any of the available wagering game machines in the flexible bank. Once a player engages a wagering game machine in the flexible bank 200, the presence of, or wagering activity of, the player can optionally be used to interrupt the CPU's schedule of thematic change or cause the CPU to shift to a mode enabling player-selection of theme of the entire flexible bank or a sub-portion thereof.

In a fourth embodiment of the flexible bank 200 concept, the CPU 30 thematically manipulates the wagering game machines on the flexible bank 200 based on a game-related event such as, but not limited to, a progressive event or a community bonus event. By way of example, with reference to the flexible bank 200 in FIG. 5, where players on wagering game machine $10_1$ and $10_4$ are playing a commonly themed wagering game, if one of the players triggers a community event game feature, the non-occupied wagering game machine display elements (i.e., A2, C1, B1, C2, E1, E2) and optionally any additional display elements (e.g., belly glass, seat backs, etc.) can be utilized to unify the content along the flexible bank by displaying the community event game feature integrally across all of the display elements. Whereas display elements C1, C2 are maintained in a dark or inactive state during normal wagering game play or an inactive state of the flexible bank 200 to permit and maintain a visual separation of differently themed sub-portions of the flexible bank and/or adjacent groupings of wagering game machines, display elements C1, C2 are utilized to enhance a continuity between adjacent sub-portions of the flexible bank and/or adjacent groupings of wagering game machines. This utilization of display elements C1, C2 could also extend, for example, to a bonus feature (e.g., a mega bonus, a progressive, etc.) that spans an entire flexible bank 200 to provide a seamless feature across all of the display elements even though different sub-portions of the flexible bank have different themes and/or are engaged in different community event game features.

As one example in which content is joined or merged, such as using display elements C1, C2, a WMS GAMING® portal application called JACKPOT EXPLOSION® works across different base game themes, but provides a common visual element of lava rising in a volcano. As the level of the lava in the volcano gets higher, it signifies a positive event (e.g., a progressive win, a jackpot win event, a community game trigger, etc.) is likely to occur. This type of game mechanic, displaying a common visual element, can be displayed on C1 and C2 type display elements continuously or intermittently consistent with a desired state of the display elements.

Since the display elements (e.g., C1, C2, etc.) may advantageously comprise non-standard display sizes, either individually and/or collectively, the final composited screen size may present challenges to graphical content specifically configured for a standard aspect ratio. In accord with the present concepts, graphical content may be made in a standard aspect ratio or made so as to permit scaling to adapt the graphical content to any possible bank display element(s) configuration.

While the content on any of the display elements may be independently driven, in at least some aspects of the present concepts, the joining or merging of display elements may comprise graphics (e.g., landscapes, theme elements or colors, etc.), static or dynamic, added in as "filler" elements or graphics for a display element disposed between two or more adjacent display elements (e.g., an arctic landscape in a display element between two adjacent wagering game machines configured to each play a PENG-WINS™ themed game, a volcanic landscape in a display element between two adjacent wagering game machines each configured to play a JACKPOT EXPLOSION®) to consume the added visual real estate. In this manner, game math would not be required to change and game complexity would not increase. In other aspects, the graphical output of the display elements A1-A2, C, and B1-B2, optionally together with display element D, are merged together into a communal community event display.

Consistent with the above concepts, a variety of bonus feature levels may be selected to correspond with different levels of involvement of the display elements. For example, content of a first grouping of display elements is joined together (e.g., A1-A2, B2-B2, C1-C2 and E1-E2) at a first level, content of a second grouping of display elements is joined together (e.g., belly glass (not shown), seat backs (not shown)) at a second level, and content of a third grouping of display elements (e.g., D) is joined together at a third level. As one example of utilizing different bonus levels on the bank, display element D could comprise an LCD that shows one or more progressive levels and, as more of the remainder of the bank joins one theme, more progressive levels are available to award the bank.

To facilitate the separation of the flexible bank 200 into a plurality of different sub-portions having different themes, the wagering game machines $\mathbf{10}_1$-$\mathbf{10}_X$ are optionally each equipped with chairs having integrated Panphonics Sound Shower® directional speakers configured to deliver high-quality, focused audio to the player of a particular wagering game machine to minimize the potential for wagering game audio output from disturbing players at other wagering game machines. Thus, a player playing Star Trek™ Battlestations at wagering game machine $\mathbf{10}_1$ will not be as likely to disturb a player playing WMS Gaming's Pirate Battle® at wagering game machine $\mathbf{10}_3$ to the same extent as would conventional, non-directional audio output. In another alternative, the directional speakers could be integrated into a structure other than the wagering game machine seats and could be secured to another structure so as to provide an area coverage for only a specific sub-portion of the flexible bank (e.g., wagering game machines $\mathbf{10}_1$-$\mathbf{10}_2$), so that players playing THE LORD OF THE RINGS™ at wagering game machines $\mathbf{10}_1$-$\mathbf{10}_2$ will not be as likely to disturb players playing THE WIZARD OF OZ™ Journey To Oz™ at wagering game machines $\mathbf{10}_3$-$\mathbf{10}_4$.

As used herein, the term game feature encompasses any game play (e.g., a second or successive game segment) outside of the base wagering game (e.g., a first game segment), in which an outcome is randomly generated responsive to a wager input and compared to predetermined paytable outcomes to determine if the randomly generated outcome corresponds to a winning outcome, and includes, but is not limited to, any single-tier or multi-tiered bonus game, secondary game, community game, or progressive game. A community game, for example, could comprise a non-competition type or cooperative type of game, an individual competition type (e.g., head-to-head competitive type), or a team competition type. Non-limiting examples of exemplary community games can be found in U.S. Pat. No. 7,780,531, titled "Gaming Machine Having A Community Game With Side Wagering" or U.S. Published Patent Application No. 2008-0045341, titled "Bank Wagering Game," each of which is incorporated herein by reference in its entirety. The game feature may have one or more game segments, each game segment comprising a discrete sub-portion of the game feature.

In another aspect of the flexible bank 200 concept, the CPU 30 maintains a single theme, but responsive to a game-related event such as, but not limited to, a progressive event or a community bonus event, causes engagement of one or more non-wagering game machine display elements (e.g., displays other than displays 12, 14) to provide a unified display of the community bonus event across multiple display elements, including those that previously had not been utilized to display flexible bank related content.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims. By way of example, the display element C shown to be generally between the wagering game machines $\mathbf{10}_2$ and $\mathbf{10}_3$ in FIG. 6 could include more than one display and could also or alternatively be disposed in a lower position than that illustrated, with one or more display elements disposed directly between wagering game machines $\mathbf{10}_2$ and $\mathbf{10}_3$ in the illustrated example. Additionally, further display elements C may advantageously be deployed at the outside ends of the outermost wagering game machines (e.g., wagering game machines $\mathbf{10}_1$ and $\mathbf{10}_4$ in the illustrated example of FIG. 6). Additionally, the flexible bank 200 could include different configurations than that shown, such as wagering game machines disposed in a back-to-back arrangement.

What is claimed is:

1. A flexible display system associated with a bank of casino wagering game machines, the display system comprising:

one or more first electronic display elements positioned above one or more first wagering game machines;

one or more second electronic display elements positioned above one or more second wagering game machines;

one or more linking display elements separating the one or more first electronic display elements from the one or more second electronic display elements;

one or more processors; and one or more memory devices storing instructions that, when executed by the one or more processors, cause the flexible display system to:

display a first theme on the one or more first electronic display elements and a second theme on the one or more second electronic display elements, and display, on the one or more linking display elements, one of a blank display or graphical content that is visually distinct from at least one of the first theme and the second theme; and responsive to a triggering event, switch at least the one or more linking display elements to function with the one or more first electronic display elements and the one or more second electronic display elements as a single display displaying a single continuous theme.

2. The display system of claim 1, wherein the first and second themes are the same theme.

3. The display system of claim 1, wherein the single theme is related to at least one of the first and second themes.

4. The display system of claim 1, wherein the triggering event includes a predetermined occupancy level of the bank, an area around the bank, or a casino containing the bank.

5. The display system of claim 1, wherein the triggering event includes a player input.

6. The display system of claim 1, wherein the triggering event includes a predetermined day, a time of day, or level of coin-in.

7. The display system of claim 1, wherein the triggering event includes triggering a community event in which at least one of the one or more first wagering game machines and at least one of the one or more second wagering game machines participate, and wherein the single theme is a community event theme.

8. The display system of claim 1, wherein the one or more first wagering game machines and the one or more second wagering game machines are configured to play different wagering games having different respective game themes.

9. The display system of claim 1, wherein the instructions further cause the display system to, in response to a subsequent trigger event, re-display the first theme on the one or more first electronic display elements and the second theme on the one or more second electronic display elements, and display, on the one or more linking display elements, one of the blank display or graphical content that is visually distinct from at least one of the first theme and the second theme.

10. A method of controlling a flexible display system associated with a bank of casino wagering game machines, the display system including one or more first electronic display elements positioned above one or more first wagering game machines, one or more second electronic display elements positioned above one or more second wagering game machines, one or more linking display elements separating the one or more first and second electronic display elements, and one or more processors, the method comprising:

displaying a first theme on the one or more first electronic display elements and a second theme on the one or more second electronic display elements;

displaying, on the one or more linking display elements, one of a blank display or graphical content that is visually distinct from at least one of the first theme and the second theme; and responsive to a triggering event, switch, by at least one of the one or more processors, at least the one or more linking display elements to function with the one or more first electronic display elements and the one or more second electronic display elements as a single display displaying a single continuous theme.

11. The method of claim 10, wherein the triggering event includes an occupancy level of the bank, an area around the bank, or a casino containing the bank.

12. The method of claim 10, wherein at least some of the display elements are physically distinct display devices.

13. The method of claim 10, wherein at least some of the display elements are separately partitioned sections of a single display device.

14. The method of claim 10, wherein the triggering event is an event occurring during a casino wagering game being played on one of the first or second wagering game machines.

15. A gaming system primarily dedicated to playing a casino wagering game, the gaming system comprising:

a first wagering game machine and a second wagering game machine, the first wagering game machine being positioned proximal to a first electronic display element and the second wagering game machine being positioned proximal to a second electronic display element, each wagering game machine being configured to play at least one casino wagering game;

one or more linking display elements separating the first electronic display element from the second electronic display element; and one or more processors configured to:

direct the first electronic display element and the electronic display element to display a first theme and a second theme, respectively, and direct the one or more linking display elements to display one of a blank display or graphical content that is visually distinct from at least one of the first theme and the second theme; and responsive to a triggering event, switch at least the one or more linking display elements to function with the first electronic display element and the second electronic display element as a single display displaying a single continuous theme.

16. The gaming system of claim 15, wherein the first wagering game machine is configured to play a first casino wagering game and the second wagering game machine is configured to play a second, different casino wagering game.

17. The gaming system of claim 15, wherein the one or more processors are further configured to, responsive to the triggering event, switch the first wagering game machine to play the same casino wagering game as the second wagering game machine.

18. The gaming system of claim 15, wherein at least some of the display elements are separately partitioned sections of a single display device.

19. The gaming system of claim 15, wherein the triggering event is an event occurring during a casino wagering game being played on one of the first or second wagering game machines.

20. The gaming system of claim 15, wherein the triggering event includes one of triggering a community event or triggering a progressive bonus event.

21. A flexible display system associated with a bank of casino wagering game machines including first and second wagering game machines, the display system comprising:

a first electronic display element positioned above the first wagering game machine;

a second electronic display element positioned above the second wagering game machine;

a linking display element separating the first electronic display element from the second electronic display element; and a controller configured to cause the flexible display system to:

display a first theme on the first electronic display element and a second theme on the second electronic display element, and display, on the linking display element, one of a blank display or graphical content that is visually distinct from at least one of the first theme and the second theme; and responsive to a triggering event, switch at least the linking display element to function with the first electronic display element and the second electronic display element as a single display displaying a single continuous theme.

22. The display system of claim 21, wherein the triggering event is selected from a group consisting of an occupancy level of the bank, an occupancy level of an area around the bank, an occupancy level of a casino containing the bank, a predetermined day, a predetermined time of day, a predetermined level of coin-in, player selection, and an event occurring during a casino wagering game played on the first or second wagering game machine.

* * * * *